(12) United States Patent
Karimidehkordi et al.

(10) Patent No.: US 12,490,331 B2
(45) Date of Patent: Dec. 2, 2025

(54) METHOD FOR BEAM RECOVERY BASED ON SPATIAL DIVERSITY OR TRANSMISSION POWER

(71) Applicant: Nokia Technologies Oy, Espoo (FI)

(72) Inventors: Ali Karimidehkordi, Munich (DE); Samantha Caporal Del Barrio, Aalborg (DK); Benny Vejlgaard, Gistrup (DK); Simon Svendsen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 313 days.

(21) Appl. No.: 18/110,102

(22) Filed: Feb. 15, 2023

(65) Prior Publication Data

US 2023/0262819 A1    Aug. 17, 2023

(30) Foreign Application Priority Data

Feb. 17, 2022    (EP) .................................... 22157199

(51) Int. Cl.

| | |
|---|---|
| *H04W 76/19* | (2018.01) |
| *H04B 7/06* | (2006.01) |
| *H04B 7/08* | (2006.01) |
| *H04B 17/17* | (2015.01) |
| *H04L 5/00* | (2006.01) |
| *H04W 52/14* | (2009.01) |
| *H04W 52/24* | (2009.01) |
| *H04W 52/42* | (2009.01) |

(Continued)

(52) U.S. Cl.
CPC ............ *H04W 76/19* (2018.02); *H04B 7/088* (2013.01); *H04L 5/0051* (2013.01); *H04W 74/0833* (2013.01); *H04W 74/0838* (2024.01)

(58) Field of Classification Search
CPC . H04W 76/19; H04W 52/245; H04W 52/246; H04W 52/48; H04W 74/0838; H04W 52/146; H04W 52/50; H04W 74/0833; H04W 52/42; H04W 72/046; H04W 74/0866; H04W 52/241; H04B 7/088; H04B 7/06956; H04B 7/06964; H04B 17/17; H04B 7/0695; H04B 7/0617; H04L 5/0051
See application file for complete search history.

(56) References Cited

U.S. PATENT DOCUMENTS

| | | | |
|---|---|---|---|
| 2011/0110453 A1 | 5/2011 | Prasad et al. | .................. 375/285 |
| 2018/0092025 A1* | 3/2018 | Selander | ............... H04L 63/123 |

(Continued)

*Primary Examiner* — Harry H Kim
(74) *Attorney, Agent, or Firm* — McCarter & English LLP

(57) ABSTRACT

An apparatus including: circuitry for receiving reference signals including a plurality of channel synchronization signal blocks and/or state information reference signals on a downlink channel; circuitry for measuring received signal power and/or quality level of said reference signals; circuitry for estimating arrival directions or an arrival antenna panel for a plurality of beams associated with said reference signals; circuitry for estimating, based on at least the received signal power and/or quality level, a required transmission power for a random access channel preamble for each beam; circuitry for selecting, in response to detecting a failure of a serving beam, another of said beams according to spatial diversity and/or required transmission power; and circuitry for sending the random access channel preamble on the selected beam.

17 Claims, 5 Drawing Sheets

(51) Int. Cl.
    *H04W 52/48*     (2009.01)
    *H04W 52/50*     (2009.01)
    *H04W 72/044*     (2023.01)
    *H04W 74/08*     (2024.01)
    *H04W 74/0833*     (2024.01)
    *H04W 74/0838*     (2024.01)

(56) References Cited

U.S. PATENT DOCUMENTS

| | | | |
|---|---|---|---|
| 2018/0176801 A1 | 6/2018 | Rune | |
| 2019/0052339 A1 | 2/2019 | Zhou et al. | |
| 2019/0215706 A1 | 7/2019 | Tsai | |
| 2020/0022000 A1* | 1/2020 | Venugopal | H04B 7/0408 |
| 2021/0051495 A1 | 2/2021 | Gupta et al. | |
| 2024/0196295 A1* | 6/2024 | Yuan | H04B 7/06964 |
| 2024/0322875 A1* | 9/2024 | Farmanbar | H04B 7/0617 |
| 2024/0396689 A1* | 11/2024 | Manolakos | H04W 64/00 |

* cited by examiner

METHOD FOR BEAM RECOVERY BASED ON SPATIAL DIVERSITY OR TRANSMISSION POWER

TECHNICAL FIELD

The present invention relates to beam recovery procedures.

BACKGROUND

One of the new service categories introduced in 5G NR networks is ultra-reliable low-latency communication (URLLC). The two latest versions of the 5G standard, 3GPP Release 15 and 16, have built the physical implementation of URLLC to meet the two conflicting requirements of reliability and latency.

Especially when considering the operating of a user equipment (UE) in the Frequency Range 2 (FR2; 24.25 GHz to 52.6 GHz) including the mmWave range, the UE implementation is expected to have multiple antenna panels to perform beam steering over a large solid angle aiming to maximize the reliability. The UE may be configured with multiple beam configurations across the panels and needs to align its narrow beam via a narrow beam alignment procedure based on reference signals sent by a network element, such as a base station, gNodeB (gNb).

Upon detecting a beam failure or a radio link failure, the UE triggers a beam recovery or a radio link recovery procedure by sending a random access preamble through the network configured contention-free random access (CFRA) or contention-based random access (CBRA) resources. Thus, the UE attempts Beam Failure Recovery (BFR) on at least one of the physical resources associated to the candidate beams configured for BFR. In case of failure in the first recovery attempt, the UE could either re-attempt over the same beam and increase the transmit power or the UE could select a different candidate beam and transmit random access preamble but without power ramping.

However, the UE decision mechanism on which gNB beam to pick for recovery is not straightforward and has implications in terms of probability of success and UE power consumption. The known UE ranking of candidate beams for a RACH procedure is sub-optimal as it lacks several factors affecting to the performance of the beams.

SUMMARY

Now, an improved method and technical equipment implementing the method has been invented, by which the above problems are alleviated. Various aspects include a method, an apparatus and a non-transitory computer readable medium comprising a computer program, or a signal stored therein, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided an apparatus comprising means for receiving reference signals comprising a plurality of channel synchronization signal blocks and/or state information reference signals on a downlink channel; means for measuring received signal power and/or quality level of said reference signals; means for estimating arrival directions or an arrival antenna panel for a plurality of beams associated with said reference signals; means for estimating, based on at least the received signal power and/or quality level, a required transmission power for a random access channel preamble for each beam; means for selecting, in response to detecting a failure of a serving beam, another of said beams according to spatial diversity and/or required transmission power; and means for sending the random access channel preamble on the selected beam.

According to an embodiment, said beams include at least one serving beam and one or more candidate beams as a back-up for the serving beam.

According to an embodiment, said means for selecting is configured to select one of said candidate beams such that the selected first candidate beam has the arrival direction differing more than a first threshold value from the arrival direction of the serving beam or an arrival antenna panel different from the antenna panel of the serving beam, and/or the required transmission power for the random access channel preamble below a second threshold value.

According to an embodiment, in response to receiving no acknowledgement to the random access channel preamble sent on said selected first candidate beam, said means for selecting is configured to select a second candidate beam among said candidate beams such that the second candidate beam has the arrival direction differing more than a first threshold value from the arrival direction of the selected first candidate beam or an arrival antenna panel different from the antenna panel of the selected first candidate beam.

According to an embodiment, the apparatus comprises means for spatially grouping the plurality of beams into two or more groups based on the arrival direction or the arrival antenna panel of the beams; wherein said means for selecting is configured to select, in response to detecting a failure of the serving beam, a candidate beam from a group different from a group including the serving and/or a previously selected candidate beam.

According to an embodiment, the apparatus comprises means for ranking the beams into a preference order based on at least the arrival direction or the arrival antenna panel of the beams and the required transmission power for the random access channel preamble of each beam.

According to an embodiment, said means for ranking the beams into the preference order is further configured to adjust the preference order based on received beam quality.

According to an embodiment, the apparatus comprises means for increasing, in response receiving no acknowledgement to the random access channel preamble sent on the selected candidate beam, transmission power of the selected candidate beam.

According to an embodiment, said means for estimating the required transmission power for the random access channel preamble is further configured to adjust the estimation based on one or more of the following: an estimated or a measured pathloss, an antenna or a beam gain, desired power level at an access point, received transmit power control command from the access point, transmission power ramping level, or a number of re-attempts for establishing a beam connection.

According to an embodiment, said means for selecting is configured to adjust the selecting of the candidate beam based on a latency for random access occasion and/or interference among the candidate beams.

According to an embodiment, the apparatus comprises means for estimating the arrival directions for the plurality of beams as an angle-of-arrival (AoA) at an antenna panel accuracy or a beam-level accuracy.

According to an embodiment, the selecting of a candidate beam is applied one or more of the following random access procedures:
  contention-free random access (CFRA) beam failure recovery,
  contention-based random access (CBRA) beam failure recovery,
  radio link failure recovery, and
  initial access.

A method according to a second aspect comprises receiving reference signals comprising a plurality of channel synchronization signal blocks and/or state information reference signals on a downlink channel; measuring received signal power and/or quality level of said reference signals; estimating arrival directions or an arrival antenna panel for a plurality of beams associated with said reference signals; estimating, based on at least the received signal power and/or quality level, a required transmission power for a random access channel preamble for each beam; selecting, in response to detecting a failure of a serving beam, another of said beams according to spatial diversity and/or required transmission power; and sending the random access channel preamble on the selected beam.

Computer readable storage media according to further aspects comprise code for use by an apparatus, which when executed by a processor, causes the apparatus to perform the above methods.

BRIEF DESCRIPTION OF THE DRAWINGS

For a more complete understanding of the example embodiments, reference is now made to the following descriptions taken in connection with the accompanying drawings in which.

DETAILED DESCRIPTION OF SOME EXAMPLE EMBODIMENTS

The following describes in further detail suitable apparatus and possible mechanisms carrying out the beam distribution. While the following focuses on 5G networks, the embodiments as described further below are by no means limited to be implemented in said networks only, but they are applicable in any network supporting beam distribution.

Figure 1:
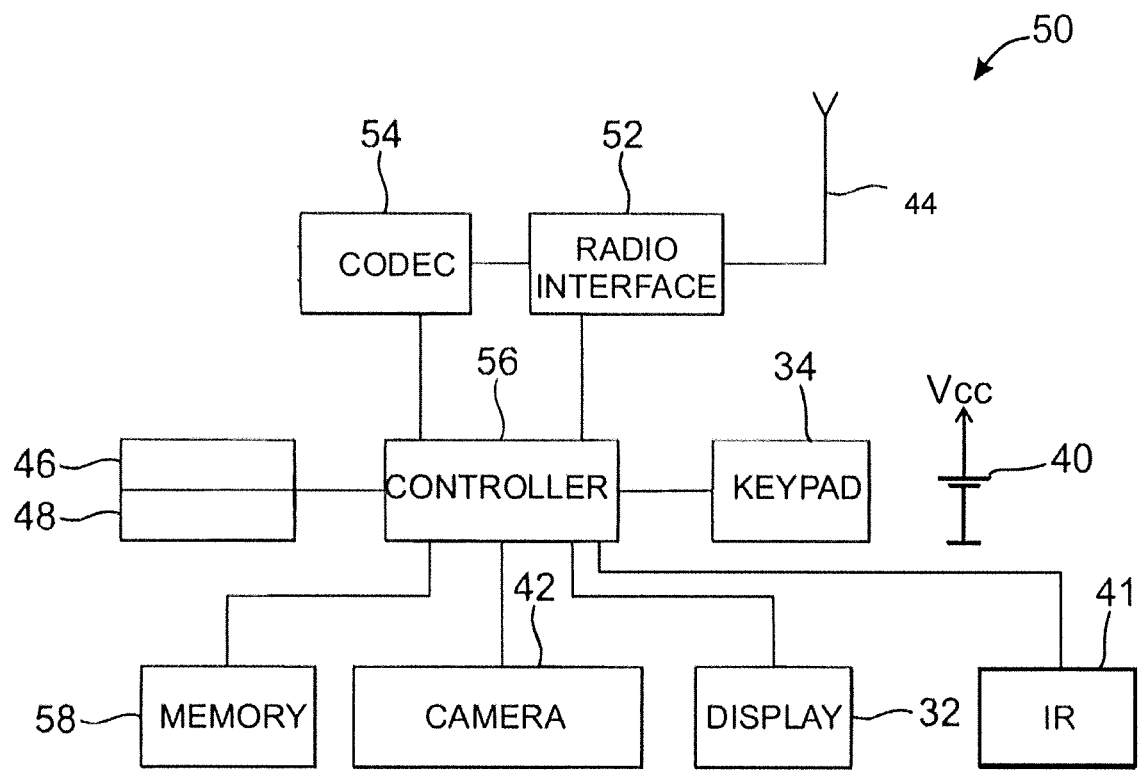
FIG. 1 shows a schematic block diagram of an apparatus for incorporating a beam distribution arrangement according to the embodiments.
Figure 2:
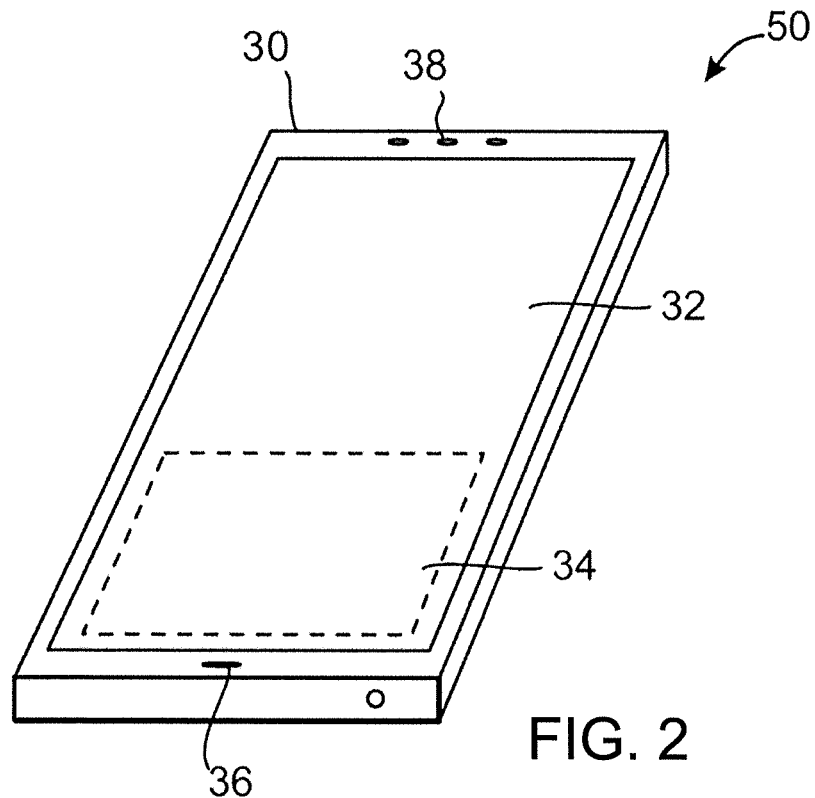
FIG. 2 shows schematically a layout of an apparatus according to an example embodiment.

In this regard, reference is first made to FIGS. 1 and 2, where FIG. 1 shows a schematic block diagram of an exemplary apparatus or electronic device 50, which may incorporate the arrangement according to the embodiments. FIG. 2 shows a layout of an apparatus according to an example embodiment. The elements of FIGS. 1 and 2 will be explained next.

The electronic device 50 may for example be a mobile terminal or user equipment of a wireless communication system. The apparatus 50 may comprise a housing 30 for incorporating and protecting the device. The apparatus 50 further may comprise a display 32 and a keypad 34. Instead of the keypad, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device, such as anyone of: an earpiece 38, speaker, or an analogue audio or digital audio output connection. The apparatus 50 may also comprise a battery 40 (or the device may be powered by any suitable mobile energy device such as solar cell, fuel cell or clockwork generator). The apparatus may further comprise a camera 42 capable of recording or capturing images and/or video. The apparatus 50 may further comprise an infrared port 41 for short range line of sight communication to other devices. In other embodiments the apparatus 50 may further comprise any suitable short-range communication solution such as for example a Bluetooth wireless connection or a USB/firewire wired connection.

The apparatus 50 may comprise a controller 56 or processor for controlling the apparatus 50. The controller 56 may be connected to memory 58 which may store both user data and instructions for implementation on the controller 56. The memory may be random access memory (RAM) and/or read only memory (ROM). The memory may store computer-readable, computer-executable software including instructions that, when executed, cause the controller/processor to perform various functions described herein. In some cases, the software may not be directly executable by the processor but may cause a computer (e.g., when compiled and executed) to perform functions described herein. The controller 56 may further be connected to codec circuitry 54 suitable for carrying out coding and decoding of audio and/or video data or assisting in coding and decoding carried out by the controller.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. A person skilled in the art appreciates that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Figure 3:
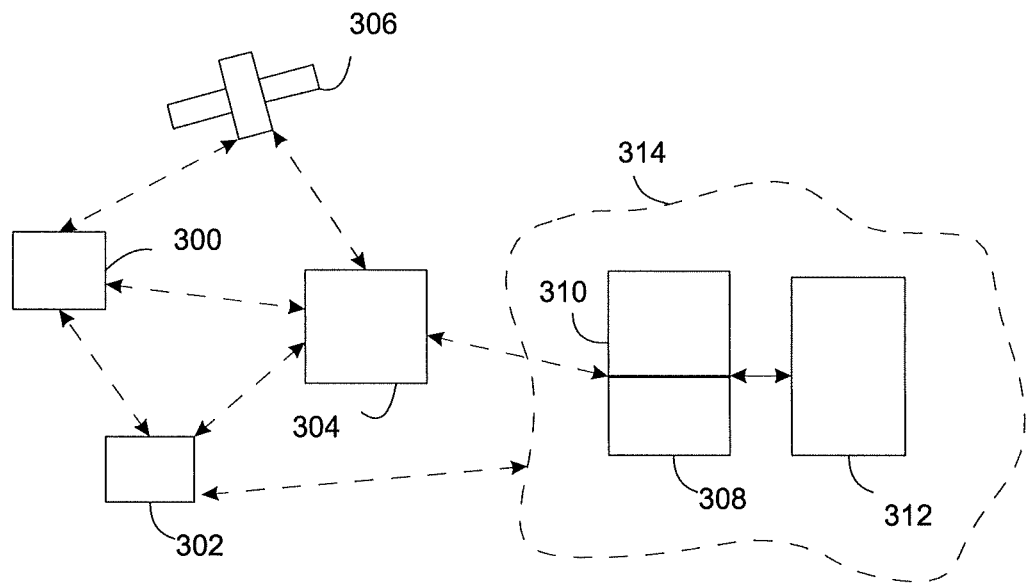
FIG. 3 shows a part of an exemplifying radio access network.

FIG. 3 depicts examples of simplified system architectures only showing some elements and functional entities, all being logical units, whose implementation may differ from what is shown. The connections shown in FIG. 3 are logical connections; the actual physical connections may be different. It is apparent to a person skilled in the art that the system typically comprises also other functions and structures than those shown in FIG. 3. The embodiments are not, however, restricted to the system given as an example but a person skilled in the art may apply the solution to other communication systems provided with necessary properties.

The example of FIG. 3 shows a part of an exemplifying radio access network.

FIG. 3 shows user devices 300 and 302 configured to be in a wireless connection on one or more communication channels in a cell with an access node (such as (e/g)NodeB) 304 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 310 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access and Mobility Management Function (AMF).

The user device (also called a user equipment (UE), a user terminal, a terminal device, a wireless device, a mobile station (MS) etc.) illustrates one type of an apparatus to which resources on the air interface are allocated and assigned, and thus any feature described herein with a user device may be implemented with a corresponding network apparatus, such as a relay node, an eNB, and an gNB. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. Accordingly, the user device may be an IoT-device. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. The access nodes of the radio network form transmission/reception (TX/Rx) points (TRPs), and the UEs are expected to access networks of at least partly overlapping multi-TRPs, such as macro-cells, small cells, pico-cells, femto-cells, remote radio heads, relay nodes, etc. The access nodes may be provided with Massive MIMO antennas, i.e. very large antenna array consisting of e.g. hundreds of antenna elements, implemented in a single antenna panel or in a plurality of antenna panels, capable of using a plurality of simultaneous radio beams for communication with the UE. The UEs may be provided with MIMO antennas having an antenna array consisting of e.g. dozens of antenna elements, implemented in a single antenna panel or in a plurality of antenna panels. Thus, the UE may access one TRP using one beam, one TRP using a plurality of beams, a plurality of TRPs using one (common) beam or a plurality of TRPs using a plurality of beams.

The 4G/LTE networks support some multi-TRP schemes, but in 5G NR the multi-TRP features are enhanced e.g. via transmission of multiple control signals via multi-TRPs, which enables to improve link diversity gain. Moreover, high carrier frequencies (e.g., mmWaves) together with the Massive MIMO antennas require new beam management procedures for multi-TRP technology.

5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

Frequency bands for 5G NR are separated into two frequency ranges: Frequency Range 1 (FR1) including sub-6 GHz frequency bands, i.e. bands traditionally used by previous standards, but also new bands extended to cover potential new spectrum offerings from 410 MHz to 7125 MHz, and Frequency Range 2 (FR2) including frequency bands from 24.25 GHz to 52.6 GHz. Thus, FR2 includes the bands in the mmWave range, which due to their shorter range and higher available bandwidth require somewhat different approach in radio resource management compared to bands in the FR1.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 312, or utilize services provided by them. The communication network may also be able to support the usage of cloud services, for example at least part of core network operations may be carried out as a cloud service (this is depicted in FIG. 3 by "cloud" 314). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU) and non-real time functions being carried out in a centralized manner (in a centralized unit, CU 308).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize non-terrestrial nodes 306, e.g. access nodes, to enhance or complement the coverage of 5G service, for example by providing backhauling, wireless access to wireless devices, service continuity for machine-to-machine (M2M) communication, service continuity for Internet of Things (IoT) devices, service continuity for passengers on board of vehicles, ensuring service availability for critical communications and/or ensuring service availability for future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or HAPSs. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node 304 or by a gNB located on-ground or in a satellite.

A person skilled in the art appreciates that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play"

(e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

The Radio Resource Control (RRC) protocol is used in various wireless communication systems for defining the air interface between the UE and a base station, such as eNB/gNB. This protocol is specified by 3GPP in in TS 36.331 for LTE and in TS 38.331 for 5G. In terms of the RRC, the UE may operate in LTE and in 5G in an idle mode or in a connected mode, wherein the radio resources available for the UE are dependent on the mode where the UE at present resides. In 5G, the UE may also operate in inactive mode. In the RRC idle mode, the UE has no connection for communication, but the UE is able to listen to page messages. In the RRC connected mode, the UE may operate in different states, such as CELL_DCH (Dedicated Channel), CELL_FACH (Forward Access Channel), CELL_PCH (Cell Paging Channel) and URA PCH (URA Paging Channel). The UE may communicate with the eNB/gNB via various logical channels like Broadcast Control Channel (BCCH), Paging Control Channel (PCCH), Common Control Channel (CCCH), Dedicated Control Channel (DCCH), Dedicated Traffic Channel (DTCH).

The transitions between the states is controlled by a state machine of the RRC. When the UE is powered up, it is in a disconnected mode/idle mode. The UE may transit to RRC connected mode with an initial attach or with a connection establishment. If there is no activity from the UE for a short time, eNB/gNB may suspend its session by moving to RRC Inactive and can resume its session by moving to RRC connected mode. The UE can move to the RRC idle mode from the RRC connected mode or from the RRC inactive mode.

The actual user and control data from network to the UEs is transmitted via downlink physical channels, which in 5G include Physical downlink control channel (PDCCH) which carries the necessary downlink control information (DCI), Physical Downlink Shared Channel (PDSCH), which carries the user data and system information for user, and Physical broadcast channel (PBCH), which carries the necessary system information to enable a UE to access the 5G network.

The user and control data from UE to the network is transmitted via uplink physical channels, which in 5G include Physical Uplink Control Channel (PUCCH), which is used for uplink control information including HARQ feedback acknowledgments, scheduling request, and downlink channel-state information for link adaptation, Physical Uplink Shared Channel (PUSCH), which is used for uplink data transmission, and Physical Random Access Channel (PRACH), which is used by the UE to request connection setup referred to as random access.

For the 5G technology, one of the most important design goals has been improved metrics of reliability and latency, in addition to network resilience and flexibility.

Especially when considering the operating of the UE in the Frequency Range 2 (FR2; 24.25 GHz to 52.6 GHz) including the mmWave range, the UE implementation is expected to have multiple antenna panels (Multi-Panel UE, MPUE) to perform beam steering over a large solid angle aiming to maximize the reliability.

In FR2, both gNB and UE are expected to operate using "narrow" beams meaning that gNB operates using radiation patterns narrower than sector-wide beams and UE operates using radiation patterns narrower than omni-directional beams.

Beam-based operation requires a good beam correspondence between the gNB and UE, which is challenging to maintain since, with very narrow beams and, therefore, a large degree of freedom in the spatial domain, it is rather sensitive to blockages and beam misalignment between gNB and UE, as well as to mobility and rotation effects of the UE.

For a UE to be able to operate in RRC Connected mode in FR2, said UE must periodically perform beam management related operations, such as channel state information reference signals/synchronization signal blocks (CSI-RS/SSB) measurements, as well as to report periodically the result of these measurements to the network.

The UE may be configured with multiple beam configurations across its antenna panels, according to which configurations to the UE aligns its narrow beams. Upon detecting a beam failure or a radio link failure, the UE triggers a beam recovery or a radio link recovery procedure by sending (pre-configured) random access preamble through the network configured contention-free random access (CFRA) or contention-based random access (CBRA) resources. Thus, the UE attempts Beam Failure Recovery (BFR) on at least one of the physical resources associated to the candidate beams configured for BFR. As such, the success of BFR is highly correlated to the choice of candidate beams for BFR.

In the BFR procedure, when a beam failure is declared, the UE selects one of the candidate BFR beams and initiates BFR procedure. In case of failure in the first recovery attempt, the UE could either re-attempt over the same beam and increase the transmit power or the UE could select a different candidate beam and transmit random access preamble but without power ramping. This decision is purely left to the UE implementation and may have a significant impact on the latency and success rate of beam failure recovery as well as on the UE power consumption.

Figure 4:
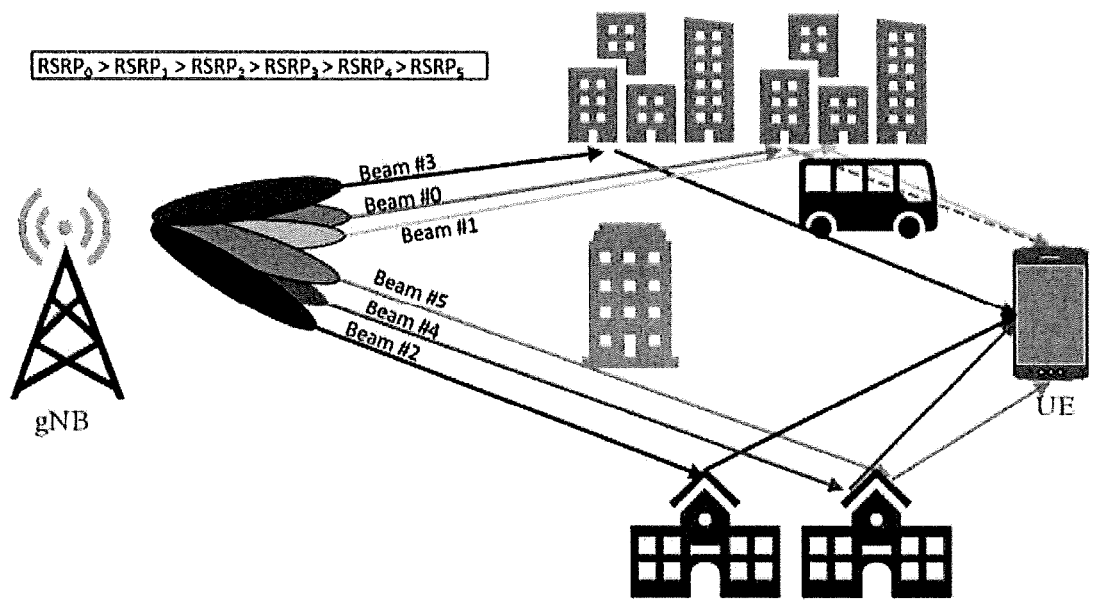
FIG. 4 shows an example of a beam failure scenario.

FIG. 4 presents one example of such a scenario in which the gNB is serving a UE using beam #0. During measurement period (SSB or CSI-RS monitoring), the UE also measures and reports candidate beams #1,2,3,4,5 and arranges them into order according to their reference signal received power level (RSRP) values ($RSRP_0 >= RSRP_1 >= RSRP_2 >= RSRP_3 >= RSRP_4 >= RSRP_5$). Based on the measurement report, the gNB configures the UE with CFRA resources corresponding to each candidate beam.

The configuration of candidate beams for BFR is referred to as candidateBeamRSList and is contained within the BeamFailureRecoveryConfigIE. The physical resources associated with the candidate beams may be periodic CSI-RS resources and/or SSBs. They are pointed by their indices, configured by the RRC list failureDetectionResources, as defined by 3GPP TS38.213 Section 6, which is a list of reference signals (RS), pointed by their indices, used for Radio Link Monitoring (RLM). SSB-based Beam Failure Detection (BFD) is based on the SSB associated to the initial downlink bandwidth part (DL BWP) and can only be configured for the initial DL BWP. For other DL BWPs, BFD may only be performed based on CSI-RS, as defined by 3GPP TS 38.133 Sections 8.5.2 and 8.5.3.

The UE performs BFR via a Random Access (RA) procedure on CFRA dedicated resources. This procedure includes UE power ramping, and the parameters of which are broadcasted in System Information Block 2 (SIB2).

Due to the presence of an obstacle (the bus in FIG. 4) that blocks beam #0, the UE experiences signal quality degradation and initiates beam failure detection and recovery. The UE selects one gNB beam (preferably among CFRA dedicated resources above pre-configured SSB/CSI-RS RSRP threshold), hence the corresponding random-access (RA) occasion, and RA preamble index for beam recovery.

However, the UE decision mechanism on which gNB beam to pick for recovery is not straightforward and has implications in terms of probability of success and UE power consumption. The UE follows only the RSRP criteria for the choice of recovery beam i.e. the beam with best received RSRP is the preferred beam for recovery. If the recovery fails after some attempts, the UE continues recovery on the next best RSRP beam. However, if the angle of arrival (AoA) of the selected candidate beam for CFRA is even substantially similar to the previous one, attempting recovery on the next best beam will not be successful either as it may also be blocked by the same obstacle. Moreover, there is also power consumption trade-off where re-attempting using same beam requires more additional power ramping. On the other hand, selecting another beam with different measured RSRP comes with different transmit power to compensate for the path-loss (and meet the pre-configured preambleReceivedTargetPower at the gNB).

For example, the UE may decide to perform random access from beam #0, but failing to receive a response from the gNB (i.e. Msg 2 of RACH procedure) during the RA window time, the UE may continue re-attempting from beam #0 by applying power ramping (e.g. 4 dB) or select another beam (e.g. beam #1, 2, 3, 4, or 5). However, choosing beams with similar angle of arrival (e.g. beam #1) compared to the blocked beam will likely lead to failure as well, due to the presence of the blocker or contention at the gNB.

It is noted that the same problem may be encountered, not only in beam recovery process, but in any situation requiring a RACH procedure, such as in initial access procedure or a handover. In other words, the known UE ranking of candidate beams for a RACH procedure is sub-optimal as it lacks several factors affecting to the performance of the beams.

Accordingly, there is a need for a method for the UE to choose more optimally between different candidate random access beams and corresponding transmit power requirements.

In the following, an enhanced method for ranking candidate beams for a RACH procedure will be described in more detail, in accordance with various embodiments.

Figure 5:
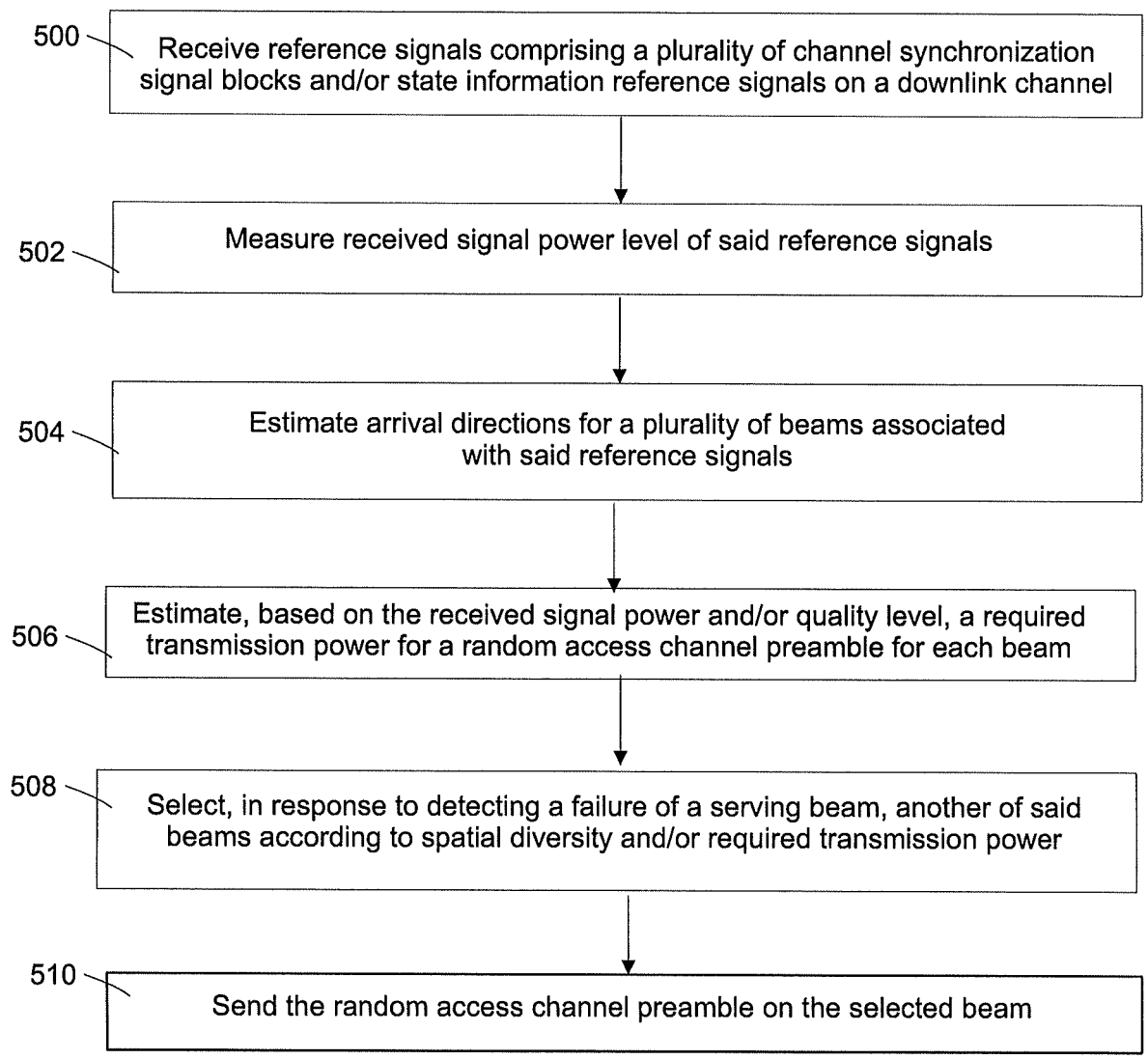
FIG. 5 shows a flow chart for a beam recovery procedure according to an embodiment.

The method, which is disclosed in flow chart of FIG. 5 as reflecting the operation of a terminal apparatus, such as a user equipment (UE), wherein the method comprises receiving (500) reference signals comprising a plurality of channel synchronization signal blocks and/or state information reference signals on a downlink channel; measuring (502) received signal power and/or quality level of said reference signals; estimating (504) arrival directions or an arrival antenna panel for a plurality of beams associated with said reference signals; estimating (506), based on at least the received signal power and/or quality level, a required transmission power for a random access channel preamble for each beam; selecting (508), in response to detecting a failure of a serving beam, another of said beams according to spatial diversity and/or required transmission power; and sending (510) the random access channel preamble on the selected beam.

Thus, instead of trying beam recovery by merely ramping up the transmission power of the serving beam or selecting the candidate beam with the next best RSRP value, the method takes into account the spatial diversity and/or required transmission power of the beams. By selecting another beam with sufficient spatial diversity to the serving beam, the probability of circumventing an obstacle possibly causing the failure of the original serving beam is significantly increased. Said another beam may also be selected based on, either solely or in combination with the requirement of sufficient spatial diversity, the required transmission power of said beam. The estimation for the required transmission power may be based at least on the reference signal received power (RSRP) level, but alternatively or additionally on quality level of said reference signals, such as Signal Interference+Noise Ratio (SINR).

Hence, the method enables to optimize the success rate of a RACH procedure, such as a BFR procedure, by selecting sufficiently spatially spaced recovery beams to mitigate blockage effects, and/or to minimize the UE power consumption. It is noted that power reduction takes place not only during the RACH procedure but especially during the following UL data transmission since UE transmission parameters will be set according to the selected recovery beam. The UE then reports the new beam to the access node, such as a gNB, and receives corresponding beam switching command from the access node.

It is noted that detecting (a.k.a. declaring) a beam failure, as used herein, may refer to a situation, where the number of beam failure instances reach to a predetermined threshold value before a preconfigured timer expires. Detecting a beam failure may also refer to a situation, where the UE cannot receive a message or an acknowledgement from the network during a predefined time. This may or may not relate to a number of predefined UL transmissions carried out by the UE. Detecting a beam failure may also refer to a situation, where the UE cannot receive or decode a certain number of transmitted signals during a predefined time.

Beam failure instance, in turn, takes place when the measured quality (such as RSRP, SINR, etc) of the (serving) beam drops below a predetermined threshold value.

According to an embodiment, said beams include at least one serving beam and one or more candidate beams as a back-up for the serving beam.

According to an embodiment, the method comprises selecting one of said candidate beams such that the selected first candidate beam has the arrival direction differing more than a first threshold value from the arrival direction of the serving beam or an arrival antenna panel different from the antenna panel of the serving beam, and/or the required transmission power for the random access channel preamble below a second threshold value.

Hence, the method takes into account the arrival directions or the arrival antenna panels of the beams and ensures that the arrival direction or antenna panel of the selected candidate beam has sufficient offset from the arrival direction of the serving beam. Additionally or alternatively, the method ensures that among the candidate beams fulfilling the arrival direction offset criteria, such candidate beam is selected which has the required transmission power for the random access channel preamble below a predetermined level.

According to an embodiment, the method comprises selecting, in response to receiving no acknowledgement to the random access channel preamble sent on said selected first candidate beam, a second candidate beam among said candidate beams such that the second candidate beam has the arrival direction differing more than a first threshold value from the arrival direction of the selected first candidate beam or an arrival antenna panel different from the antenna panel of the selected first candidate beam.

Consequently, if there is no response from the access node, e.g. the gNB, to the random access channel preamble sent on said selected first candidate beam within a predetermined period, such as defined by a timer for a random access occasion, the UE concludes that a second candidate beam may be selected for the transmission of the random access channel preamble. Now the UE selects a candidate beam, which is sufficiently spatially spaced from the first candidate beam, but still fulfils the condition for the required transmission power for the random access channel preamble below a second threshold value. It is noted that the second candidate beam may or may not have the arrival direction differing more than a first threshold value from the arrival direction of the original serving beam or an arrival antenna panel different from the antenna panel of the original serving beam.

The UE may repeat the selecting process as many times as needed for a successful beam recovery. In other words, if there is no response from the access node to the random access channel preamble sent on said selected second candidate beam within the predetermined period, the UE selects a third candidate beam for the transmission of the random access channel preamble using the above criteria, etc.

According to an embodiment, the method comprises spatially grouping the plurality of beams into two or more groups based on the arrival direction or the arrival antenna panel of the beams; wherein in response to detecting a failure of the serving beam, a candidate beam is selected from a group different from a group including the serving beam.

Thus, the beams may be grouped into a plurality of groups based on their arrival direction or their arrival antenna panel. A first group may include the serving beam and possibly one or more candidate beams with sufficiently similar arrival direction to the arrival direction of the serving beam or received with the same antenna panel as the serving beam. For example, all candidate beams having an arrival direction deviating from the arrival direction of the serving beam less than said first threshold value may be grouped into the same group with the serving group. A second group of beams may be formed in a similar manner: a group of candidate beams having an arrival direction deviating from the arrival direction of the serving beam more than said first threshold value, but having their mutual arrival directions within said first threshold value may be grouped into the same group, i.e. the second group. Alternatively, the second group of beams may be formed from candidate beams received with a different antenna panel than the serving beam. A number of further groups may be formed in a similar manner.

For example, considering the example shown in FIG. 4, the serving beam #0 and the candidate beam #1 could be grouped into the first group, the candidate beams #2 and #4 could be grouped into the second group, the candidate beam #3 could be considered to form the third group and the candidate beam #5 could be considered to form the fourth group.

Now in response to detecting a failure of the serving beam, the candidate beam for a new serving beam is selected from a group different from the group including the serving beam, i.e. from another group than the first group, in order to possibly avoid the same obstacle causing the failure of the serving beam. When selecting the candidate beam within said another group than the first group, the same rule as mentioned above is applied: such candidate beam is selected which has the required transmission power for the random access channel preamble below a predetermined level, i.e. below the second threshold value.

According to an embodiment, the method comprises ranking the beams into a preference order based on at least the arrival direction or the arrival antenna panel of the beams and the required transmission power for the random access channel preamble of each beam.

Hence, the UE may rank the beams into a preference order such that if the serving beam fails, the second beam in the preference order is reported to the access node. If no response from the access node is received, the third beam in the preference order is reported to the access node etc. If the beams are spatially grouped into a plurality of groups, each group may have a group-specific preference order for the beams included in the group. The ranking may be carried out according to an algorithm, which may primarily emphasize the sufficient offset between the arrival directions of the selected candidate beam and the serving beam, and secondarily emphasize the required transmission power for the random access channel preamble of the candidate beam.

According to an embodiment, the method comprises adjusting the preference order based on received beam quality. Thus, the signal quality of the received beam, such as SINK, may be used as secondary criteria for further adjusting the preference order.

According to an embodiment, the method comprises increasing, in response receiving no acknowledgement to the random access channel preamble sent on the selected candidate beam, transmission power of the selected candidate beam.

The UE power ramping parameters in a random access procedure are broadcasted in System Information Block 2 (SIB2). Therein, PREAMBLE_RECEIVED_TARGET_POWER is determined by following equation:

PREAMBLE_RECEIVED_TARGET_POWER=PreambleReceivedTargetPower (in RRC)+DELTA_PREAMBLE+PREAMBLE_POWER_RAMPING_COUNTER−1)×PREAMBLE_POWER_RAMPING_STEP, where DELTA_PREAMBLE is determined by pre-defined tables in 3GPP TS 38.321 V15.3.0—Table 7.3-1 and 7.3-2 and where PREAMBLE_POWER_RAMPING_COUNTER starts at 0 and is incremented 1 for every PRACH retransmission until it reaches preambleTransMax. Table 1 presents preconfigured candidate values for PREAMBLE_POWER_RAMPING_STEP, as defined by 3GPP TS 38.331.

TABLE 1

| PREAMBLE_POWER_RAMPING_STEP [dB] |
| --- |
| 0 |
| 2 |
| 4 |
| 6 |

Thus, the UE may re-attempt the beam recovery with the selected candidate beam at least once by ramping up the transmission power. If no acknowledgement is received with the increased transmission power, the UE may decide to select yet another candidate beam.

According to an embodiment, the estimation of the required transmission power for the random access channel preamble is further configured to be adjusted based on one or more of the following: an estimated or a measured pathloss, an antenna or a beam gain, desired power level at an access point, received transmit power control command from the access point, transmission power ramping level, or a number of re-attempts for establishing a beam connection.

Thus, in addition to the received signal power and/or quality level, further criteria may be used for adjusting the estimation of the required transmission power for the random access channel preamble. For example, an estimated or a measured pathloss of the signals on the transmission path of the beam may affect to the estimation. Similarly, the prevailing parameters of an antenna or a beamforming gain of the UE may affect to the estimation. Moreover, the gNB may provide the UE with information about a desired power level for a beam upon receiving the beam at the gNB, and the estimation of the transmission power for each beam may be adjusted accordingly. More generally, the gNB may provide the UE with a transmit power control command for any underlying reason. The transmission power ramping level and the number of re-attempts needed for establishing a beam connection are typically linked together: after an unsuccessful beam connection, the transmission power level would require to be ramped up by one step for a new attempt of establishing a beam connection, and in theory, this could be readjusted by a sufficient number of the transmission power ramping levels so that the beam connection would be established. However, for the beams requiring the transmission power level to be ramped up, this is preferably taken into account in the estimation of the transmission power for said beam.

According to an embodiment, the selecting of the candidate beam is further adjusted based on a latency for random access occasion and/or interference among the candidate beams.

Hence, if the latency for random access occasion, i.e. the time the UE has to wait for the random access occasion to transmit the preamble, for a given candidate beam is long, the probability of selecting said candidate beam may be diminished e.g. by ranking said candidate beam lower in the preference order. Similarly, if it is noticed that a given candidate beam experiences significant interference from one or more other beams, said candidate beam may be ranked lower in the preference order.

According to an embodiment, the selecting of a candidate beam is applied in one or more of the following random access procedures:
 contention-free random access (CFRA) beam failure recovery (BFR),
 contention-based random access (CBRA) beam failure recovery,
 radio link failure recovery, and
 initial access.

Thus, the method is not limited to contention-free random access (CFRA) beam failure recovery (BFR) or contention-based random access (CBRA) BFR procedures, but it can be applied in any random access procedure.

Figure 6:
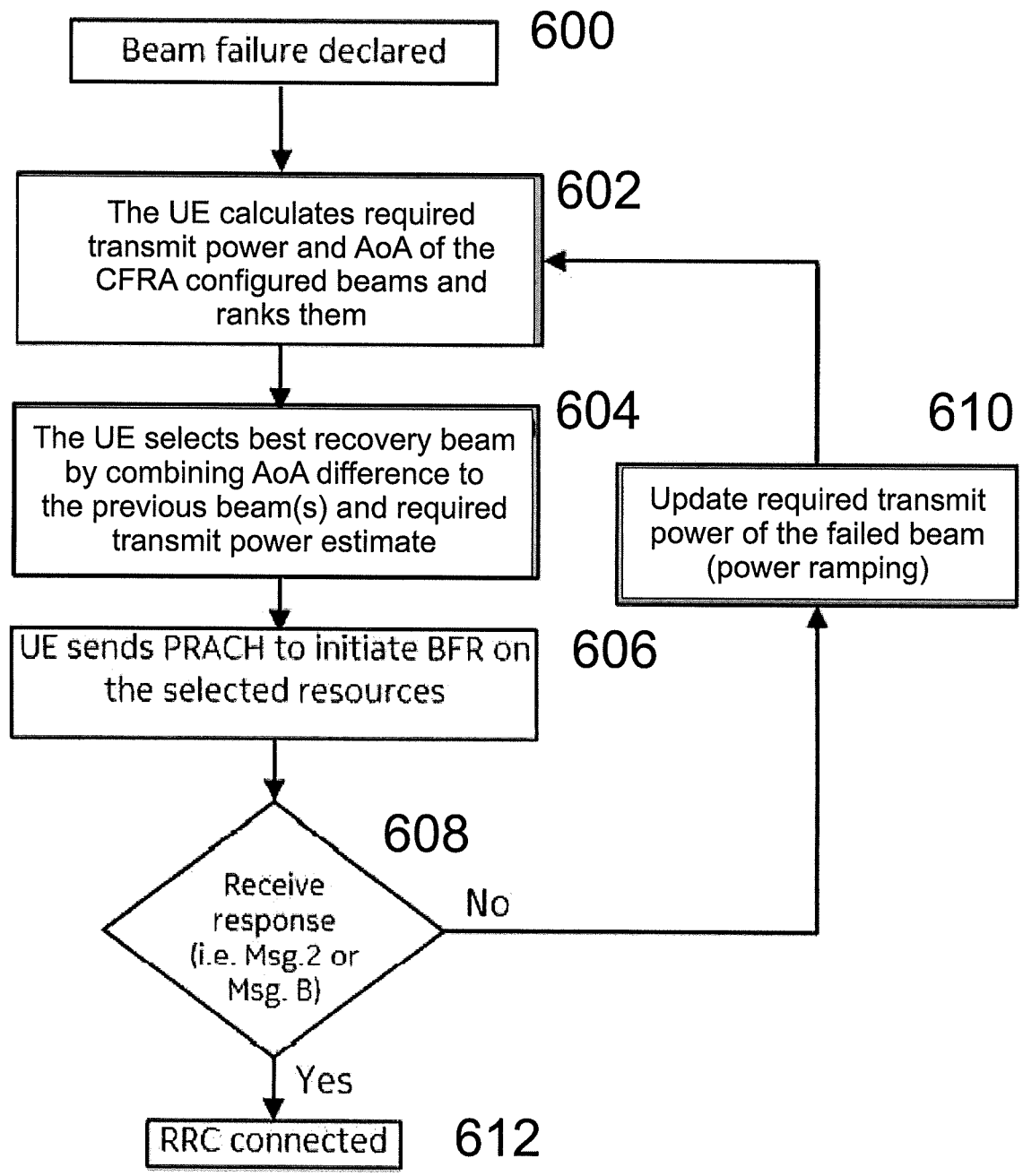
FIG. 6 shows a flow chart for a beam recovery procedure according to various embodiments.

Some of the above embodiments are illustrated in the flow chart of FIG. 6. In case of detecting (600) a beam failure (or radio link failure), in order to initiate BFR, the UE calculates (602) the arrival directions, such as the angle-of-arrival (AoA), of the CFRA configured resources and the corresponding required transmit power based on the measured RSRP. The UE ranks the beams corresponding to CFRA resources such that when an attempt fails, the next attempt selected (604) by the UE is a recovery beam with sufficient AoA difference from the previous beam (e.g. a different UE panel) and the lowest required transmit power (i.e. power ramping level). The UE carries out (606) PRACH configuration and initiates the BFR on the selected beam. In case of still failing in beam recovery (608), the UE updates (610) the power ramping level and repeats the beam selection procedure (602-606) by taking into account the AoA of the failed beam and also the required power ramping of the already selected beam for re-attempting. As a result of the joint combination of AoA and required UE transmission power for beam selection, a more robust performance of BFR is obtained, thus significantly reducing link establishment time and corresponding latency.

According to an embodiment, the method comprises estimating the arrival directions for the plurality of beams as an angle-of-arrival (AoA) at an antenna panel accuracy or a beam-level accuracy.

Herein, the Rx filter of the UE may be used as a reference for estimating the AoAs. For example, analog beam steering may be used for estimating the AoA by correlating received power levels and/or phase values, when configured with different known and stored radiation patterns. The known and stored radiation patterns will typically be configured by utilizing sub-sets of the antenna array and not those used for the actual wireless communication.

Figure 7:
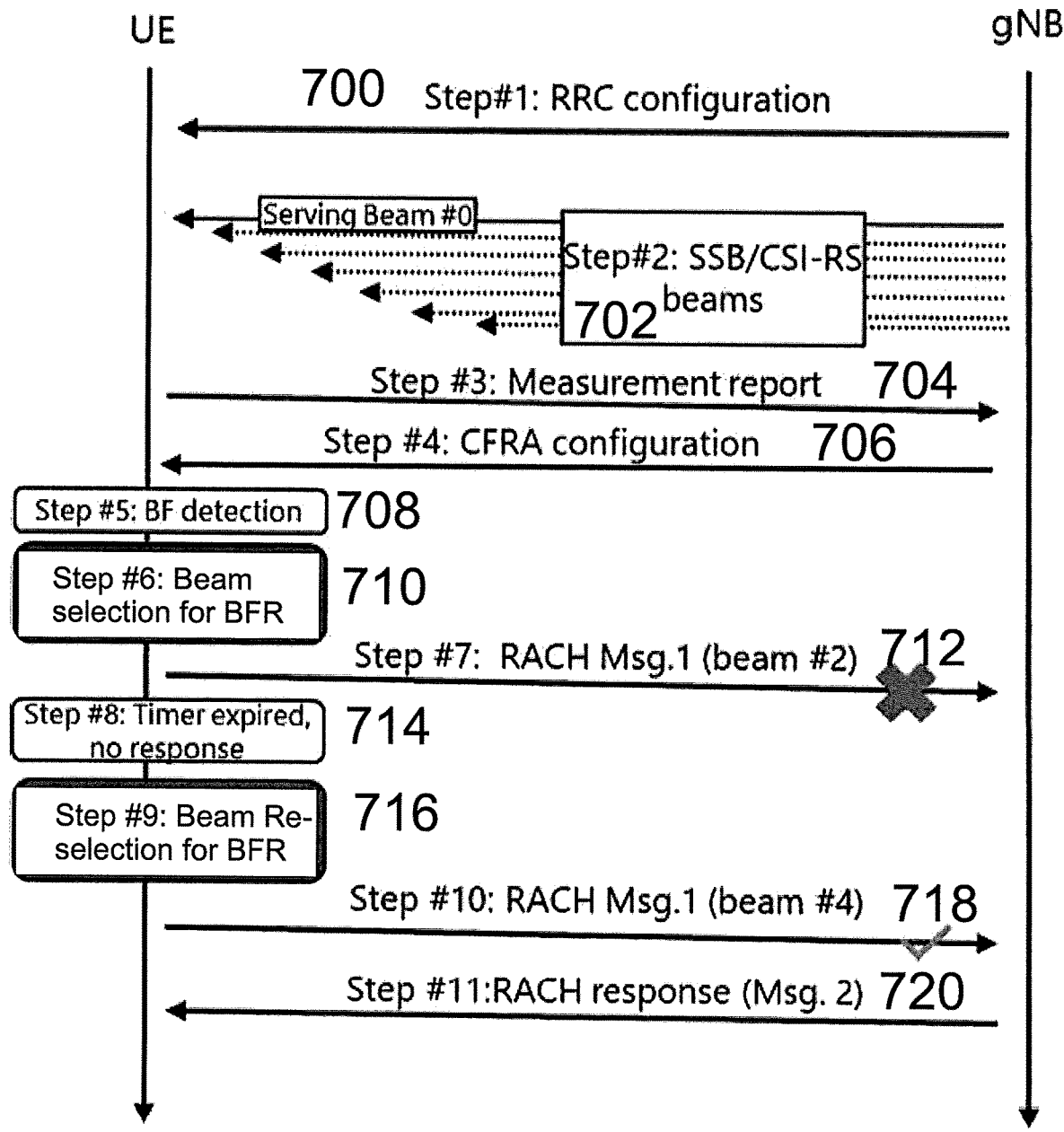
FIG. 7 shows a signalling chart for a beam recovery procedure according to various embodiments.

The method and at least some of the embodiments are illustrated in the signalling chart of FIG. 7. It is noted that the numerals of the signalling chart do not necessary reflect the actual order of events, but the events may take place in different order or in parallel. It is further noted that while the method and the embodiments are described in connection with contention-free random access (CFRA) beam failure recovery (BFR), the procedure may be equally generalized to contention-based random access (CBRA) beam failure recovery, radio link failure recovery, and initial access, as discussed above. The method starts by the gNB applying a RRC Configuration (700) for the UE, wherein the UE is configured to measure and report a set of preferred beams to the network.

The gNB then transmits (702) downlink (DL) reference signals through different beams over the preconfigured resources. Transmission of the reference signals may be either in the format of SSB or CSI-RS.

The UE measures the received reference signals and selects a set of preferred beams (for example, those with measured RSRP above preconfigured rsrp-ThresholdCSI-RS/rsrp-ThresholdSSB, as required 3GPP TS 38.321) including a serving beam and multiple candidate (backup) beams. The UE reports (704) the corresponding measurements to the network, wherein the measurements may include at least the beam IDs supplemented with their measured quality parameter(s) (e.g. RSRP, RSRQ, SINR, etc.).

The gNB configures (706) the UE with the CFRA parameters (e.g. PRACH preamble format, time/frequency resources for PRACH transmission, preamble index, etc.).

The UE then declares (708) a beam failure based on the measurement configurations (e.g. RSRP threshold, measurement period) provided by the gNB.

Consequently, the UE selects (710) a candidate beam and triggers the beam failure recovery (BFR) procedure. The BFR can be performed from the same or a different panel based on device capability. The beam selection may be carried out, for example, as follows:

The UE calculates the AoA and the power requirement of each candidate beam based on the RSRP measurement of the reference signals. Based on this, a first threshold value, i.e. an AoA-threshold (AoAth) (defined in degrees), is determined, as well as a second threshold value, i.e. a Power-threshold (TPth) (defined in dBs). Beam #x is selected for recovery if:

1. The difference between the required transmit power (TPx) of beam #x and a beam with the lowest transmit power (TPmin) is less than the defined power-threshold, i.e. |TPx−TPmin|≤TPth, and 2. The difference between the measured AoA (AoAx) of beam #x and the AoA of the previous failed beam (AoA fail) is greater than the AoAth, i.e. |AoAx−AoA-fail|≥AoAth. The offset as defined in degrees with respect to the failed beam may be known at the UE (e.g. by using Rx beam filtering knowledge or by using more advanced techniques). The UE may also discard gNB beams that are defined as quasi co-location (QCL) type D beams, since they have the same AoA.

Thus, the first threshold value is used to avoid blockage by choosing a beam which has been received from different path compared to already blocked one. The second threshold value, in turn, guarantees sufficient received signal strength at the gNB and ensures low power consumption.

It is noted that the choice of TPth and AoAth may depend on various factors, such as device capabilities (e.g. maximum transmit power, antenna array configuration), measured beam qualities, and service requirements. For example, a power-limited UE which is located at the cell-edge may decide to select beams with higher RSRP values (i.e. lower TPth) for recovery without emphasizing much on the AoA. However, for a cell-centred UE (that benefits from sufficient power headroom) maintaining the connection is important. Thus, the UE may select beams with higher AoA difference to maintain a robust connection against potential blockage.

The UE then sends (712) PRACH to initiate BFR over the selected beam (beam #2) and its corresponding RACH occasion. The UE also starts a timer for receiving a response for the BFR request, i.e. ra-ResponseWindow timer. If ra-ResponseWindow expires and the UE does not receive a response (i.e. PDCCH) that matches the transmitted preamble, the UE considers the random-access response reception unsuccessful (714).

Now, instead of re-attempting from the same beam and increasing the power, the UE carries out the BFR beam selection (716) by searching among the available beam candidates and selecting a beam with sufficient offset in AoA that requires lower transmit power. The UE sends (718) PRACH to initiate BFR over the selected beam (beam #4) and its corresponding RACH occasion. The UE again starts the timer for receiving a response for the BFR request, i.e. ra-ResponseWindow timer. The UE considers the BFR successful when it receives (720) a PDCCH including a response (i.e. Msg. 2 or Msg. B) to the transmitted preamble index.

The method and the related embodiments may provide various advantages. The method and the related embodiments are applicable to any RACH procedure, i.e. for initial access, for beam recovery, for handover, etc. Especially with CFRA, the service interruption time, i.e. time for re-establishing a successful connection to the gNB, may be reduced significantly. This has the effect in recovery procedures to reduce latency and interruption time, as well as in handover procedures to avoid radio link failures. The method and the related embodiments optimize the number of recovery attempts leading to a successful connection by including additional parameters to RSRP metric, namely AoA difference between the different gNB beams corresponding to CFRA configuration. The UE ensures that consecutive attempts are on sufficiently spatially different beams. Furthermore, the UE optimizes UE power consumption by prioritizing resources requiring minimal UE Tx power, which is particularly relevant for the subsequent UL data transmission during a RRC_Connection.

An apparatus, such as a UE, according to an aspect comprises means for receiving reference signals comprising a plurality of channel synchronization signal blocks and/or state information reference signals on a downlink channel; means for measuring received signal power and/or quality level of said reference signals; means for estimating arrival directions or an arrival antenna panel for a plurality of beams associated with said reference signals; means for estimating, based on at least the received signal power and/or quality level, a required transmission power for a random access channel preamble for each beam; means for selecting, in response to detecting a failure of a serving beam, another of said beams according to spatial diversity and/or required transmission power; and means for sending the random access channel preamble on the selected beam.

According to an embodiment, said beams include at least one serving beam and one or more candidate beams as a back-up for the serving beam.

According to an embodiment, said means for selecting is configured to select one of said candidate beams such that the selected first candidate beam has the arrival direction differing more than a first threshold value from the arrival direction of the serving beam or an arrival antenna panel different from the antenna panel of the serving beam, and/or the required transmission power for the random access channel preamble below a second threshold value.

According to an embodiment, in response to receiving no acknowledgement to the random access channel preamble sent on said selected first candidate beam, said means for selecting is configured to select a second candidate beam among said candidate beams such that the second candidate beam has the arrival direction differing more than a first threshold value from the arrival direction of the selected first candidate beam or an arrival antenna panel different from the antenna panel of the selected first candidate beam.

According to an embodiment, the apparatus comprises means for spatially grouping the plurality of beams into two or more groups based on the arrival direction or the arrival antenna panel of the beams; wherein said means for selecting is configured to select, in response to detecting a failure of the serving beam, a candidate beam from a group different from a group including the serving and/or a previously selected candidate beam.

According to an embodiment, the apparatus comprises means for ranking the beams into a preference order based on at least the arrival direction or the arrival antenna panel of the beams and the required transmission power for the random access channel preamble of each beam.

According to an embodiment, said means for ranking the beams into the preference order is further configured to adjust the preference order based on received beam quality.

According to an embodiment, the apparatus comprises means for increasing, in response receiving no acknowledgement to the random access channel preamble sent on the selected candidate beam, transmission power of the selected candidate beam.

According to an embodiment, said means for estimating the required transmission power for the random access channel preamble is further configured to adjust the estimation based on one or more of the following: an estimated or a measured pathloss, an antenna or a beam gain, desired power level at an access point, received transmit power control command from the access point, transmission power ramping level, or a number of re-attempts for establishing a beam connection.

According to an embodiment, said means for selecting is configured to adjust the selecting of the candidate beam based on a latency for random access occasion and/or interference among the candidate beams.

According to an embodiment, the apparatus comprises means for estimating the arrival directions for the plurality of beams as an angle-of-arrival (AoA) at an antenna panel accuracy or a beam-level accuracy.

According to an embodiment, the selecting of a candidate beam is applied one or more of the following random access procedures:
- contention-free random access (CFRA) beam failure recovery,
- contention-based random access (CBRA) beam failure recovery,
- radio link failure recovery, and
- initial access.

An apparatus according to a further aspect comprises at least one processor and at least one memory, said at least one memory stored with computer program code thereon, the at least one memory and the computer program code configured to, with the at least one processor, cause the apparatus at least to perform: receive reference signals comprising a plurality of channel synchronization signal blocks and/or state information reference signals on a downlink channel; measure received signal power and/or quality level of said reference signals; estimate arrival directions or an arrival antenna panel for a plurality of beams associated with said reference signals; estimate, based on at least the received signal power and/or quality level, a required transmission power for a random access channel preamble for each beam; select, in response to detecting a failure of a serving beam, another of said beams according to spatial diversity and/or required transmission power; and send the random access channel preamble on the selected beam.

According to an embodiment, said beams include at least one serving beam and one or more candidate beams as a back-up for the serving beam.

According to an embodiment, the apparatus comprises computer program code configured to, with the at least one processor, cause the apparatus at least to select one of said candidate beams such that the selected first candidate beam has the arrival direction differing more than a first threshold value from the arrival direction of the serving beam or an arrival antenna panel different from the antenna panel of the serving beam, and/or the required transmission power for the random access channel preamble below a second threshold value.

According to an embodiment, the apparatus comprises computer program code configured to, with the at least one processor, cause the apparatus at least to select, in response to receiving no acknowledgement to the random access channel preamble sent on said selected first candidate beam, a second candidate beam among said candidate beams such that the second candidate beam has the arrival direction differing more than a first threshold value from the arrival direction of the selected first candidate beam or an arrival antenna panel different from the antenna panel of the selected first candidate beam.

According to an embodiment, the apparatus comprises computer program code configured to, with the at least one processor, cause the apparatus at least to spatially group the plurality of beams into two or more groups based on the arrival direction or the arrival antenna panel of the beams; and select, in response to detecting a failure of the serving beam, a candidate beam from a group different from a group including the serving and/or a previously selected candidate beam.

According to an embodiment, the apparatus comprises computer program code configured to, with the at least one processor, cause the apparatus at least to rank the beams into a preference order based on at least the arrival direction or the arrival antenna panel of the beams and the required transmission power for the random access channel preamble of each beam.

According to an embodiment, the apparatus comprises computer program code configured to, with the at least one processor, cause the apparatus at least to adjust the preference order based on received beam quality.

According to an embodiment, the apparatus comprises computer program code configured to, with the at least one processor, cause the apparatus at least to increase, in response receiving no acknowledgement to the random access channel preamble sent on the selected candidate beam, transmission power of the selected candidate beam.

According to an embodiment, the apparatus comprises computer program code configured to, with the at least one processor, cause the apparatus at least to adjust the estimation based on one or more of the following: an estimated or a measured pathloss, an antenna or a beam gain, desired power level at an access point, received transmit power control command from the access point, transmission power ramping level, or a number of re-attempts for establishing a beam connection.

According to an embodiment, the apparatus comprises computer program code configured to, with the at least one processor, cause the apparatus at least to adjust the selecting of the candidate beam based on a latency for random access occasion and/or interference among the candidate beams.

According to an embodiment, the apparatus comprises computer program code configured to, with the at least one processor, cause the apparatus at least to estimate the arrival directions for the plurality of beams as an angle-of-arrival (AoA) at an antenna panel accuracy or a beam-level accuracy.

Such apparatuses may comprise e.g. the functional units disclosed in any of the FIGS. 1-3 for implementing the embodiments.

A further aspect relates to a computer program product, stored on a non-transitory memory medium, comprising computer program code, which when executed by at least one processor, causes an apparatus at least to perform: receive reference signals comprising a plurality of channel synchronization signal blocks and/or state information reference signals on a downlink channel; measure received signal power and/or quality level of said reference signals; estimate arrival directions or an arrival antenna panel for a plurality of beams associated with said reference signals; estimate, based on at least the received signal power and/or quality level, a required transmission power for a random access channel preamble for each beam; select, in response to detecting a failure of a serving beam, another of said beams according to spatial diversity and/or required transmission power; and send the random access channel preamble on the selected beam.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

The invention claimed is:

1. An apparatus, comprising:
   at least one processor; and
   at least one non-transitory memory storing instructions that, when executed with the at least one processor, cause the apparatus to perform:
   receiving reference signals comprising at least one of a plurality of channel synchronization signal blocks or state information reference signals on a downlink channel;
   measuring at least one of received signal power or quality level of said reference signals;
   estimating arrival directions or an arrival antenna panel for a plurality of beams associated with said reference signals;
   estimating, based on at least one of the received signal power or quality level, a required transmission power for a random access channel preamble for the plurality of beams;
   selecting, in response to detecting a failure of a serving beam, another of said plurality of beams according to at least one of spatial diversity or required transmission power; and
   sending the random access channel preamble on the selected beam; and
   ranking at least one beam of the plurality of beams into a preference order based on at least the arrival direction or the arrival antenna panel of the ranked beams and the required transmission power for the random access channel preamble of the ranked beams.

2. The apparatus according to claim 1, wherein said plurality of beams include at least one serving beam and one or more candidate beams as a back-up for the serving beam.

3. The apparatus according to claim 2, wherein said instructions, when executed with the at least one processor, cause the apparatus to select one of said one or more candidate beams such that at least one of:
   a selected first candidate beam has the arrival direction differing more than a first threshold value from the arrival direction of the serving beam or an arrival antenna panel different from the antenna panel of the serving beam, or
   the required transmission power for the random access channel preamble is below a second threshold value.

4. The apparatus according to claim 3, wherein:
   in response to receiving no acknowledgement to the random access channel preamble sent on said selected first candidate beam, said instructions, when executed with the at least one processor, cause the apparatus to select a second candidate beam among said candidate beams such that the second candidate beam has the arrival direction differing more than a first threshold value from the arrival direction of the selected first candidate beam or an arrival antenna panel different from the antenna panel of the selected first candidate beam.

5. The apparatus according to claim 1, wherein the apparatus is further caused to perform,
   spatially grouping the plurality of beams into two or more groups based on the arrival direction or the arrival antenna panel of the beams;
   wherein said instructions, when executed with the at least one processor, cause the apparatus to select, in response to detecting a failure of the serving beam, a candidate beam from a group different from a group including at least one of the serving beam or a previously selected candidate beam.

6. The apparatus according to claim 1, wherein the instructions, when executed with the at least one processor, cause the apparatus to adjust the preference order based on received beam quality.

7. The apparatus according to claim 1, wherein the apparatus is further caused to perform,
   increasing, in response to receiving no acknowledgement to the random access channel preamble sent on the selected candidate beam, transmission power of the selected candidate beam.

8. The apparatus according to claim 1, wherein the instructions, when executed with the at least one processor, cause the apparatus to adjust the estimation based on one or more of:
   an estimated or a measured pathloss,
   an antenna or a beam gain,
   desired power level at an access point,
   received transmit power control command from the access point,
   transmission power ramping level, or
   a number of re-attempts for establishing a beam connection.

9. The apparatus according to claim 1, wherein the instructions, when executed with the at least one processor, cause the apparatus to adjust the selecting of the candidate beam based on at least one of a latency for random access occasion or interference among the candidate beams.

10. The apparatus according to claim 1, wherein the apparatus is further caused to perform estimating the arrival directions for the plurality of beams as an angle-of-arrival at an antenna panel accuracy or a beam-level accuracy.

11. The apparatus according to claim 1, wherein the selecting of a candidate beam is applied one or more of the following random access procedures:
    contention-free random access beam failure recovery,
    contention-based random access beam failure recovery,
    radio link failure recovery, or
    initial access.

12. A method comprising:
receiving reference signals comprising at least one of a plurality of channel synchronization signal blocks or state information reference signals on a downlink channel;
measuring at least one of received signal power or quality level of said reference signals;
estimating arrival directions or an arrival antenna panel for a plurality of beams associated with said reference signals;
estimating, based on at least one of the received signal power or quality level, a required transmission power for a random access channel preamble for the plurality of beams;
selecting, in response to detecting a failure of a serving beam, another of said beams according to at least one of spatial diversity or required transmission power;
sending the random access channel preamble on the selected beam; and
ranking at least one beam of the plurality of beams into a preference order based on at least the arrival direction or the arrival antenna panel of the ranked beams and the required transmission power for the random access channel preamble of the ranked beams.

13. The method according to claim 12, wherein
said plurality of beams include at least one serving beam and one or more candidate beams as a back-up for the serving beam.

14. The method according to claim 13, comprising
selecting one of said candidate beams such that a selected first candidate beam has at least one of
the arrival direction differing more than a first threshold value from the arrival direction of the serving beam or an arrival antenna panel different from the antenna panel of the serving beam, or
the required transmission power for the random access channel preamble below a second threshold value.

15. The method according to claim 14, comprising
selecting, in response to receiving no acknowledgement to the random access channel preamble sent on said selected first candidate beam, a second candidate beam among said candidate beams such that the second candidate beam has the arrival direction differing more than a first threshold value from the arrival direction of the selected first candidate beam or an arrival antenna panel different from the antenna panel of the selected first candidate beam.

16. The method according to claim 12, comprising
spatially grouping the plurality of beams into two or more groups based on the arrival direction or the arrival antenna panel of the beams; and
selecting, in response to detecting a failure of the serving beam, a candidate beam from a group different from a group including at least one of the serving beam or a previously selected candidate beam.

17. A non-transitory program storage device readable by an apparatus, tangibly embodying a program of instructions executable with the apparatus for performing operations, the operations comprising:
receiving reference signals comprising at least one of a plurality of channel synchronization signal blocks or state information reference signals on a downlink channel;
measuring at least one of received signal power or quality level of said reference signals;
estimating arrival directions or an arrival antenna panel for a plurality of beams associated with said reference signals;
estimating, based on at least one of the received signal power or quality level, a required transmission power for a random access channel preamble for the beam;
selecting, in response to detecting a failure of a serving beam, another of said beams according to at least one of spatial diversity or required transmission power;
sending the random access channel preamble on the selected beam; and
rank at least one beam of the plurality of beams into a preference order based on at least the arrival direction or the arrival antenna panel of the ranked beams and the required transmission power for the random access channel preamble of the ranked beams.

* * * * *